United States Patent Office 2,969,272
Patented Jan. 24, 1961

2,969,272

PREPARATION OF SILICEOUS MATERIALS

Jayanti Dharma Teja, Whitestone, N.Y., assignor to Montecatini-Società Generale per l'Industria Mineraria e Chimica, Milan, Italy, a corporation of Italy No Drawing. Filed Apr. 26, 1957, Ser. No. 655,446

4 Claims. (Cl. 18—54)

This invention relates to methods of preparation of siliceous materials, such as glass fibers, and to siliceous compositions having great usefulness, as for example, in the machine-drawing of glass fibers from aqueous systems.

This application is a continuation-in-part of several related applications by the inventor herein, and reference is made to the common subject matter contained therein, reference being made particularly to: Ser. No. 511,131, filed May 25, 1956, entitled Preparation of High Molecular Weight Materials; Ser. No. 526,779 filed August 1955, now abandoned, entitled Manufacturing Glass Fibers.

In accordance with the present invention, an aqueous alkaline system containing polymeric silicate fibrils having a molecular weight greater than 5000 is formed into a viscous stream of moderately small dimensions, and this viscous stream is passed through a gaseous atmosphere while being subjected to a very considerable stretching, such that the $l/d$ ratio is greater than 25, thereby bringing about the formation of useful polymeric siliceous material, such as a glass fiber.

The technical subject matter of the present invention can be better understood from a consideration of the following examples.

EXAMPLE I

A paste is prepared by adding 16.5 g. of boria (as 30 g. of boric acid) plus 30 g. of alumina (as 45 g. of alumina trihydrate) and 20 g. of zinc oxide to 200 g. of 30% colloidal silica. This paste is added to 500 g. of 40% polymeric sodium trisilicate solution prepared by evaporating 600 g. of 33% sodium silicate (3.00 ratio) to remove 25% of the water. This is diluted with 200 g. of a 20% solution of sodium metasilicate and then dispersed in 2400 g. of 33% sodium trisilicate. This is heated for 3 hours on a waterbath to form a viscous liquid having a solids content of about 40%, a viscosity (falling ball method) at a temperature within the range from 40° C. to 75° C. within the range from 200 poises to 2,000 poises. The product can be filtered in the manner customary for spinning solutions. The viscous liquid at 75° C. is extruded downwardly through a 45 micron orifice, and undergoes a considerable stretching by reason of the gravitational force. A sufficiently strong fiber is formed in the stream, thirty feet below the orifice to permit some handling thereof. After the fiber stream falls through a drying zone, it can be attached to a reel, and the speed of fiber production and the extent of stretching can be increased beyond their gravitational rates.

Data relating to the formulation of this advantageous spinning composition is shown in Table I.

Table 1

|  | $H_2O$ | $Na_2O$ | $SiO_2$ | $B_2O_3$ | ZnO | $Al_2O_3$ | Total |
|---|---|---|---|---|---|---|---|
| Colloidal silica | 140 |  | 60 |  |  |  | 200 |
| Additives |  |  |  | 16.5 | 20 | 30 | 66.5 |
| Concentrated silicate | 300 | 50 | 150 |  |  |  | 500 |
| Metasilicate | 160 | 20 | 20 |  |  |  | 200 |
| Trisilicate | 1,600 | 200 | 600 |  |  |  | 2,400 |
| Before concentration | 2,200 | 270 | 830 | 16.5 | 20 | 30 | 3,366.5 |
| Spinning solution | 1,750 | 270 | 830 | 16.5 | 20 | 30 | 2,916.5 |
| Percent wet | 60.0 | 9.5 | 28.4 | 0.5 | 0.7 | 1.0 |  |
| Percent dry |  | 23.8 | 70.9 | 1.3 | 1.6 | 2.4 |  |

In pilot plant operation in which the glass fiber is collected by machinery, the other variables can be regulated to bring about a decrease or increase in the stretch upon the viscous stream during the transformation of the viscous stream into a glass fiber. At much higher collection speeds, it is desirable to make appropriate modifications of the pressure of extrusion of the viscous liquid through the orifice, and related variables in order to achieve the desired stretch without troublesome breakage of the stream.

A series of tests are conducted for determining the minimum stretch necessary for achieving good quality glass fibers by the stretching technique. The physical characteristics of a machine drawn fiber provide the evidence relating to the effect of a change in the amount of stretching. The stretch factor $(s)$ is expressed as the square root of the length $(l)$ of a fiber having the same solids content as a theoretical sphere of diameter $(d)$, said sphere having the composition of the viscous liquid. The remarkable results of the invention are achieved by adjusting other variables to achieve a stretch factor greater than 5. That is, $$\sqrt{\frac{l}{d}}$$

should be greater than 5. If the square root is eliminated, the minimum stretching of the viscous stream can be expressed as a ratio of length of siliceous product to the diameter of the theoretical sphere of viscous liquid of the same solids content, which ratio must be greater than 25. Stretch factors above 5 are deemed to be necessary for industrial utilization of the stretching technique in machine-drawing of viscous siliceous materials.

EXAMPLE II

A series of glass fibers are prepared by machine-drawing of a viscous aqueous liquid containing polysilicate fibrils having a molecular weight greater than 5,000. The viscous liquid and stretching zone are maintained at an elevated temperature between the range from 40° to 80° C. The viscosity, surface tension, and related properties of the spinning solutions are measured at the spinning temperature. Advantages are obtained by controlling the viscosity of the spinning solution at spinning temperatures to within the range from 200 to 3000 poises. Various mixtures of viscous liquids can be prepared to achieve such viscosity. Although there may not be exact reproducibility in the preparation of some of the viscous liquids resulting from the linear polymerization of siliceous materials by reason of the variabilities such as non-uniformity of distribution of the catalytic components, this problem is overcome by the ease of diluting, blending and/or concentrating various batches of polymeric silicate in preparing a batch of spinning solution. In preparing compositions for drawing glass fibers at a rate of a few yards per second at room temperature, it is not possible to consider such variables as temperature, extrusion pressure, fiber speed, orifice diameter and the like. A wider range of formulations can be employed in machine-drawing than in hand-drawing of glass fibers. Machine-drawing of the glass fibers makes possible a wide range of formulations suitable for preparing glass fibers at appropriate spinning conditions, each such siliceous compositions having a viscosity within the 200 to 3000 poise range at a temperature within the 40–80° C. range.

EXAMPLE III

A spinning solution for machine-drawing of glass fibers, the stretching of the viscous stream to form a glass fiber providing a stretching factor within the range from 5 to 25 is prepared in a manner similar to Example I, by concentrating a mixture of the following proportions:

|  | G. |
|---|---|
| Colloidal silica 30% | 300 |
| Additives: |  |
| Alumina | 30 |
| Magnesia | 20 |
| Zinc oxide | 10 |
| Sodium bifluoride | 10 |
| Concentrated 40% sodium silicate, 4.3 ratio | 500 |
| Regular sodium silicate, 35% | 1000 |

The fluoride ion in said composition serves in lieu of the borate ion. The fluoride ion in minor amounts is apparently capable of aiding the polymerization in a manner similar to the action of the borate ion. Additional evidence that acidic anions, in combination with the glass-forming metal oxides, aid the catalysis of linear polymerization of silicates is obtained by preparing excellent glass fibers by machine drawing of a spinning solution containing 20 g. of $NaF-Na_3PO_4-12H_2O$ instead of NaF—HF, but otherwise like said fluoride containing composition. By a series of such tests, it is established that advantages accrue from preparing a spinning solution by the concentration of an aqueous alkaline silicate solution containing controlled amounts of both an acidic ion of the group consisting of borate, fluoride and phosphate and a glass forming metal oxide.

All spinning solutions are prepared to achieve appropriate viscosity characteristic for whatever spinning conditions are desired, it being important that the viscous solution be flowable through the orifice and sufficiently stretchable (because its content of linear poly-silicate fibrils of more than 5000 molecular weight and viscosity above 200 poise) to comply with the stretching factor greater than 5.

EXAMPLE IV

An aqueous system was prepared using 120 g. of 30% colloidal silica solution, 11 g. boric acid, 76 g. alumina, 7 g. zinc oxide, 250 g. concentrated silicate, 300 g. sodium trisilicate solution and 200 g. sodium metasilicate solution. Strong glass fibers were hand drawn from the concentrated solution. The viscous liquid was filtered and the filtrate was employed in a fiber-forming apparatus to form strong glass fibers by application of a stretch factor greater than 5. Certain components were preferentially removed from the composition by the filtration, as indicated by the analysis of the hand-drawn and machine-drawn fibers, as shown:

|  | hand-drawn | machine-drawn |
|---|---|---|
| $Na_2O$ | 18.0 | 23.8 |
| $SiO_2$ | 57.6 | 65.5 |
| $B_2O_3$ | 1.7 | 5.0 |
| $Al_2O_3$ | 20.8 | 3.8 |
| $ZnO$ | 1.9 | 1.8 |

It is impossible to obtain reliable information concerning the pre-filtration composition of the viscous liquid by analyzing the machine-drawn glass fiber because sometimes there may be preferential deposition of components during the filtering step which precedes passage of the spinning composition through a fine orifice of a glass fiber making machine.

EXAMPLE V

A sodium silicate solution having a silica to sodium oxide ratio of 3.22 to 1 is modified by the presence of minor amounts of aluminum oxide and calcium oxide. This solution is concentrated from an initial solids content of 30% to a final solids content of 42% by heating the body of solution to evaporate water therefrom. In this manner, polysilicate fibrils having a molecular weight such as 5,000 are formed.

The thus prepared viscous composition containing the polysilicate fibrils of at least 5,000 molecular weight is forced downwardly through an orifice having a diameter less than about 400 microns, but greater than 200 microns. The viscous stream flows downwardly through a gaseous atmosphere, gravitational forces bringing about a very considerable stretching of the stream, whereby the stretch factor (square root of length of fiber to sphere of viscous liquid of same solids content) is greater than 5. The viscosity of solution, orifice diameter, temperature, and related factors affect how much stretching can be accomplished by gravitational force. During this stretching of the stream, the polysilicate fibrils undergo a transformation to a different kind of siliceous material. If the diameter of the viscous stream initially is sufficiently small so that the stream is gravitationally stretched to a small diameter such as 4 to 7 microns, or in same cases up to 20 microns, the resulting fiber will be a high strength glass fiber. However, if the orifice diameter is in the 200–400 micron range, neither gravitational stretching nor any presently established magnitude of machine stretching of this particular spinning solution can transform the stream into glass fibers but instead such stretching of the stream forms fibers of hydrated inorganic composition having low density, low strength, and other characteristics evidencing the absence of an anhydrous glass in the fiber structure. The falling stream includes an evaporation zone whereby water is removed, thus helping the stream to develop solid characteristics. These hydrated inorganic fibers are collected at the bottom of the polymerization tower.

These hydrated inorganic fibers are leached with water. If cold water is employed and if other precautions are taken, samples can be obtained for light-scattering studies on high molecular weight linear polysilicates. On an industrial basis, advantages are obtained by leaching the hydrated inorganic fibers at a temperature of about 45° C. for about 1 hour, thereby reducing the sodium oxide content of the polysilicate material. After the sodium content of the polysilicate material has been thus reduced, the residual material can be employed in any of a variety of procedures. For example, a large amount of very hot water, such as 95° C. water can be employed to disperse the product in water. The hot water brings about depolymerization, but fibrils of at least 5,000 molecular weight may be preserved, especially if the dealkalized fibers are dispersed rapidly. Even with good agitation, the concentration of solids obtained in this redissolving step may be objectionably low and it may be advantageous to reconcentrate the solution. Such solutions, with or without reconcentration, are useful in the protective coating, adhesive, and other arts employing aqueous solutions of sodium silicate.

EXAMPLE VI

A viscous liquid prepared in accordance with Example V is subjected to the steps of Example V, that is, stretching to large diameter fibers, leaching to remove readily separated sodium, and redissolving of the residue, to prepare an aqueous dispersion of polysilicate fibrils. Transforming the siliceous material by stretching the viscous stream provides a technique which can be repeated as frequently as desired to obtain silicate solutions having useful properties not readily achieved by some alternative procedures. These aqueous alkaline silicate dispersions of fibrils are useful for many of the purposes for which sodium silicate solutions have been used, possessing advantages attributable to the linear structure of the polysilicate fibrils.

EXAMPLE VII

A viscous liquid containing polysilicate fibrils and having an average molecular weight of at least 20,000, and having a $SiO_2:Na_2O$ ratio greater than 4:1, and a solids content of 40% is prepared by redissolving the residue from leaching large diameter inorganic fibers. This viscous liquid is passed downwardly through an orifice of about 45 micron diameter and gravitationally stretched by a strech factor greater than 5 to form a strong glass fiber having a diameter less than 15 microns. The glass fiber possesses a high tensile strength, and the density, refractive index, and other properties proving that it is an amorphous glass fiber substantially equivalent to the glass fibers formed from a fused anhydrous silicate of the same composition. Still better fibers result when this composition is machine-drawn to provide still higher stretch factor.

EXAMPLE VIII

It is sometimes desirable to prepare strong glass fibers having a sodium content less than the sodium content of the product of the linear polymerization in the aqueous system. One method of reducing sodium content involves the water-leaching of large-diameter inorganic fibers as described in previous examples. Modifications thereof include the leaching with a dilute acid such as phosphoric acid, or leaching with an aqueous solution (e.g. from about 2 to 5%) of a salt of a glass-forming oxide, such as zirconium nitrate, aluminum formate, or the like. Glass fibers containing less than 6% sodium oxide can be prepared in this manner.

In converting aqueous solutions resulting from the linear polymerization of silicates into solutions for spinning fibers containing a lower sodium content, several procedures other than the formation of an intermediate large diameter fiber are possible. For example, solutions of linear polymeric silicate can be diluted with sufficient water to a solids content below 31% and to a solution viscosity below 10 poise and subjected to dialysis at room temperature for 72 hours. Using a cellulosic membrane, and a circulating outer solution containing about 1% sodium aluminate, the sodium content of the silicate solution can be significantly reduced.

Suitable ion-exchange procedures are also effective in reducing the alkali metal (sodium and potassium) content of the solutions of linear polymeric silicates intended for glass fiber spinning solutions. Thus, granules of the acid form of sulfonate resin can be immersed in the solution for a few minutes absorbing significant quantities of sodium ion from the solution, which retains sufficient sodium ion and hydroxyl ion to be of alkaline pH.

EXAMPLE IX

Individuals controlling the final formulation of a siliceous spinning liquid require instruments for measuring the viscosity and rheological properties of the possible components and blends, instruments for measuring surface tension, and instruments for measuring other chemical and physical characteristics of the viscous liquids.

In addition to the requirement for the viscosity within the 100–3000 poise range, it has also been found that spinnable solutions generally have a surface tension greater than 120 dyne centimeters.

Fibers formed at 24° C. and 60% relative humidity by hand and/or gravitational stretching of analytical samples of a satisfactory spinning solution generally have a viscosity of at least $10^{13}$ poises when tested by the stream relaxation method of J. O. Jones, J. Soc. Glass Tech., 28, 432 (1944).

Machine-drawn glass fibers generally possess densities within the range from 2.2 to 2.7. A density gradient column can be prepared comprising two halogenated organic solvents, in which balls of standard densities will maintain their level to provide a graduated density gauge. Glass fibers immersed in such a density gradient fall to a level corresponding to the fiber density. Large diameter highly hydrated fibers may have densities only slightly higher than the densities of the spinning solutions or even up to about 1.9. However, the fine diameter completely dehydrated glass fibers machine drawn at a stretch factor greater than 5 consistently have densities greater than 2.1. In evaluating the degree of dehydration of a fiber by density measurements, consideration must be given to the approach toward the density of a fused fiber of corresponding composition. Glasses containing large amounts of lead oxide, zirconia and thoria possess high densities. If the density of the machine drawn fiber is more than 90% of the density of a fused glass of such composition, the fiber is likely to have the high strength and other desired characteristics.

Machine-drawn fibers were measured and found to possess torsional tangent alpha values within a range from about 10 to 50. These fibers could be wrapped about a loop only 20 times the fiber diameter, thus equalling the loop test performance of fused glass fibers.

Many of the machine-drawn fibers possessed a Young's modulus within the range from 2500 to 10,000 kg./mm.$^2$, thus surpassing the characteristics of some generally used fused glass fibers. It has been established that glass fibers prepared from aqueous systems consistently possess Young's modulus characteristics at least 10% higher than the Young's modulus of a glass fiber of the same composition prepared from fused glass. Some of the machine drawn fibers had a Poisson's ratio of from 0.15 to 0.23, providing additional evidence that the fibers were truly glass fibers.

In preparing machine-drawn fibers, some evidence indicated that after the stream contracted to its ultimate diameter further shrinkage of the fiber occurred longitudinally and such longitudinal (as distinguished from diametrical) shrinkage may amount to from 0.5 to 20%. The stretch factor is generally determined on the fiber subsequent to such longitudinal shrinkage.

The refractive index of the small diameter fibers may be within the range from about 1.48000 to about 1.51000 depending upon the glass composition. The presence of internal hydrates within the fiber can sometimes be detected by refractive index measurements.

Obviously various modifications of the illustrative examples are possible without departing from the proper scope of the present invention as set forth in the appended claims.

The invention claimed is:

1. The method of preparing amorphous glass fibers from a viscous siliceous aqueous composition which includes the steps of directing a stream of viscous siliceous aqueous composition downwardly through an orifice, passing the stream downwardly through a gaseous atmosphere, subjecting the stream to a stretching of such magnitude that the square root of the ratio of the length of the resulting siliceous product to the diameter of a theoretical sphere of said viscous siliceous aqueous composition having a total solids content equal to the solids content of said length of product is greater than 5, and evaporating the water from the stream of siliceous product, whereby a relatively high rate of collection of the resulting amorphous glass fiber is achieved without troublesome breakage of said stream, said viscous aqueous composition consisting essentially of water, oxygen-con taining compounds of silicon comprising amorphous silicate particles of colloidal dimensions, oxygen-containing compounds of at least one alkali metal of the group consisting of sodium and potassium, and oxyegn-containing compounds of at least one metal of the group consisting of boron, aluminum, zirconium, titanium, zinc, calcium, barium, arsenic, germanium, phosphorus, lead, thorium, beryllium, and tungsten, the oxides of said metals constituting a non-alkaline glass component oxide group.

2. The method of claim 1 in which the viscous siliceous aqueous composition employed in stretch-forming the glass fiber is prepared by dissolving the residue from the selective removal of alkali oxide from large diameter fibrous product resulting from the stretching of a stream of siliceous aqueous composition, the solids of which contain more than 25% alkali oxide.

3. The method of claim 1 in which the viscous siliceous aqueous composition has at a temperature range from 40° to 80° C., a viscosity within the range from 200 to 3000 poises and a surface tension greater than 120 dyne centimeters.

4. A glass fiber prepared in accordance with the method of claim 1 and having a Young's modulus within the range from 2500 to 10,000 kg./mm.$^2$.

References Cited in the file of this patent

UNITED STATES PATENTS

| | | |
|---|---|---|
| 2,338,463 | Skaupy | Jan. 4, 1944 |
| 2,551,684 | Lodge | May 8, 1951 |

FOREIGN PATENTS

| | | |
|---|---|---|
| 352,681 | Great Britain | July 16, 1931 |